US010520742B1

(12) United States Patent
Sulai et al.

(10) Patent No.: US 10,520,742 B1
(45) Date of Patent: Dec. 31, 2019

(54) BEAMSPLITTER ASSEMBLY FOR EYE TRACKING IN HEAD-MOUNTED DISPLAYS

(71) Applicant: Facebook Technologies, LLC, Menlo Park, CA (US)

(72) Inventors: Yusufu Njoni Bamaxam Sulai, Bothell, WA (US); Brian Wheelwright, Sammamish, WA (US); Jacques Gollier, Redmond, WA (US); Alexander Sohn, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 64 days.

(21) Appl. No.: 15/684,675

(22) Filed: Aug. 23, 2017

Related U.S. Application Data

(60) Provisional application No. 62/458,301, filed on Feb. 13, 2017.

(51) Int. Cl.
*G02B 27/14* (2006.01)
*G06F 3/01* (2006.01)
*G02B 27/00* (2006.01)
*G02B 5/30* (2006.01)

(52) U.S. Cl.
CPC .......... *G02B 27/141* (2013.01); *G06F 3/013* (2013.01); *G02B 5/3025* (2013.01); *G02B 27/0025* (2013.01)

(58) Field of Classification Search
CPC .............. G02B 27/141; G02B 27/0025; G02B 5/3025; G06F 3/013
USPC ........................................................... 345/8
See application file for complete search history.

(56) References Cited

U.S. PATENT DOCUMENTS

| 7,414,595 | B1 | 8/2008 | Muffler | |
|---|---|---|---|---|
| 2015/0035744 | A1* | 2/2015 | Robbins | G02B 27/017 345/156 |
| 2016/0240013 | A1* | 8/2016 | Spitzer | G06F 3/013 |
| 2016/0260258 | A1* | 9/2016 | Lo | G06T 7/00 |
| 2017/0227777 | A1* | 8/2017 | Carollo | G02B 27/0176 |

* cited by examiner

*Primary Examiner* — Mark Edwards
(74) *Attorney, Agent, or Firm* — Fenwick & West LLP

(57) ABSTRACT

A head-mounted display includes an electronic display configured to output image light, an optics assembly configured to direct image light in a first band from the electronic display to an eye box, an eye tracking unit configured to generate eye tracking information, and a beamsplitter configured to redirect light in a second band reflected from the eye box toward the eye tracking unit and transmit the image light in the first band. The beamsplitter includes a first region and a second region, and a first portion that joins the first region and the second region is curved such that an angle between the first region and the optical axis is larger than an angle between second region and the optical axis, and the beamsplitter is positioned along the optical axis between the optics assembly and the electronic display.

18 Claims, 8 Drawing Sheets ns

BEAMSPLITTER ASSEMBLY FOR EYE TRACKING IN HEAD-MOUNTED DISPLAYS

CROSS REFERENCE TO RELATED APPLICATIONS

This application claims the benefit of U.S. Provisional Application No. 62/458,301, filed Feb. 13, 2017, which is incorporated by reference in its entirety.

BACKGROUND

The present disclosure generally relates to eye tracking, and specifically relates to using a beamsplitter assembly for eye tracking in virtual reality and/or augmented reality applications.

Some conventional head-mounted displays (HMDs) include an eye tracking subsystem. The eye tracking subsystem includes a camera that images a user's eye, and the images can be used by the eye tracking subsystem to track movement of the eye. Design of conventional eye tracking subsystems include eye tracking components that, e.g., separate optical paths for light used for eye tracking from optical paths used for content. To maximize comfort for a user of a HMD, it is desirable to minimize a size and weight of the HMD. Unfortunately, for HMDs that include eye tracking subsystems, the placement and design of eye tracking components often unduly increase the form factor and weight of the HMD.

SUMMARY

A beamsplitter assembly is configured to separate optical paths for light used for eye tracking from optical paths for light used for display content in a head mounted display in a virtual reality (VR) environment, an augmented reality (AR) environment, a mixed reality (MR) environment, or some combination thereof. A head-mounted display includes an electronic display configured to output image light, an optics assembly configured to direct image light in a first band from the electronic display to an eye box, an eye tracking unit configured to generate eye tracking information, and a beamsplitter assembly is configured to redirect light in a second band reflected from the eye box toward the eye tracking unit and transmit the image light in the first band.

In some embodiments, the beamsplitter assembly includes a partially curved beamsplitter. For example, the partially curved beamsplitter includes a first region and a second region, and a first portion that joins the first region and the second region is curved such that an angle between the first region and the optical axis is larger than an angle between second region and the optical axis. The partially curved beamsplitter is positioned along the optical axis between the optics assembly and the electronic display, and allows for a smaller distance between the optics assembly and the electronic display that would otherwise occur if the beamsplitter were flat.

In some embodiments, the beamsplitter assembly includes a convex beamsplitter that is positioned such that one end of the convex beamsplitter is closer to the optics assembly (e.g., a pancake lens) than the other end. Not only does a convex beamsplitter have a larger field of view than a flat beamsplitter, but it also results in a smaller distance between the optics assembly and the electronic display.

In some embodiments, the beamsplitter assembly includes one or more polarizers (e.g., a circular polarizer) in addition to one or more beamsplitters to mitigate stray visible light as a result of reflections emanating from the optics assembly.

In some embodiments, the beamsplitter assembly includes multiple beamsplitters that direct reflected light the eye to the eye tracking unit. The multiple beamsplitters allow for multiple fields of view of the eye to be captured by the eye tracking unit.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Head-Mounted Display Overview

Figure 1A:
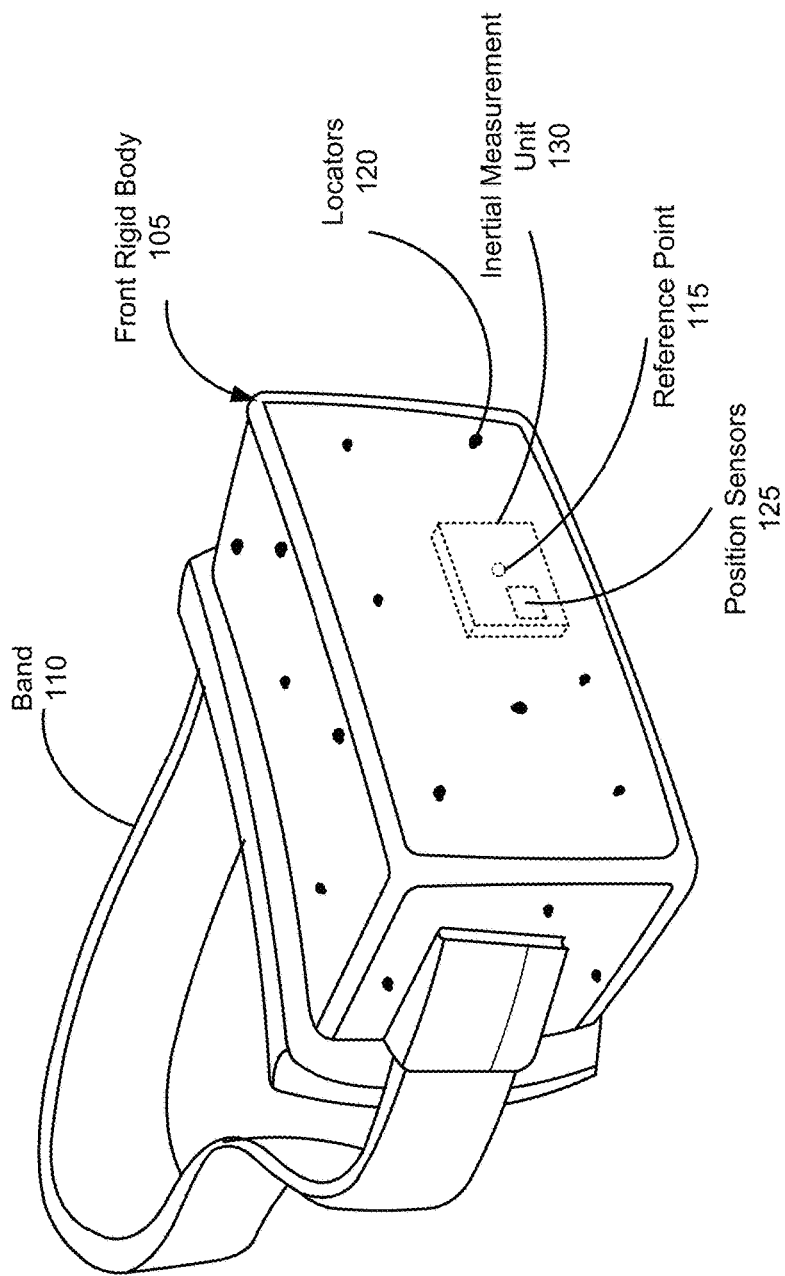
FIG. 1A is a diagram of a head-mounted display (HMD), in accordance with an embodiment.

FIG. 1A is a diagram of a head-mounted display (HMD) 100, in accordance with an embodiment. The HMD 100 includes a front rigid body 105 and a band 110. The front rigid body 105 includes an electronic display element of an electronic display (not shown in FIG. 1A), an optics assembly (not shown in FIG. 1A), a beamsplitter assembly (not shown in FIG. 1A), a reference point 115, locators 120, one or more position sensors 125, and an inertial measurement unit (IMU) 130. In the embodiment shown by FIG. 1A, the position sensors 125 are located within the IMU 130, and neither the IMU 130 nor the position sensors 125 are visible to a user. In some embodiments, the HMD 100 may act as a virtual reality (VR) headset, an augmented reality (AR) headset, a mixed reality (MR) headset, or some combination thereof. In embodiments that describe AR system environment, the HMD 100 augments views of a physical, real-world environment with computer-generated elements (e.g., images, video, sound, etc.). For example, one or more portions of the HMD 100 may be at least partially transparent. In embodiments that describe MR system environments, the HMD 100 merges views of physical, real-word environment with virtual environment to produce new environments and visualizations where physical and digital objects co-exist and interact in real time. The reference point 115, locators 120, IMU 130, and the position sensors 125 are discussed in detail below with respect to FIG. 4.

Figure 1B:
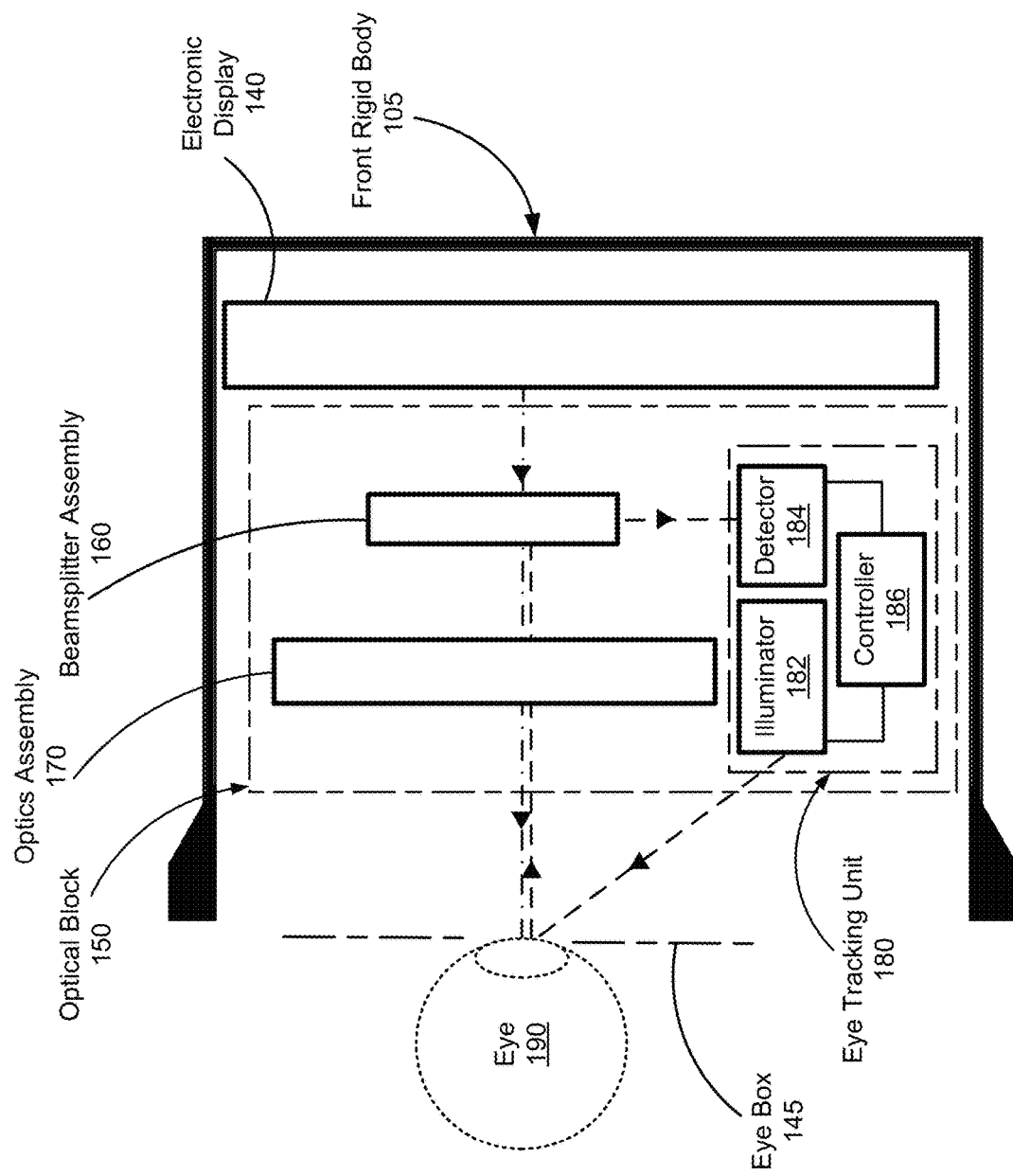
FIG. 1B is a cross section of a front rigid body of the HMD in FIG. 1A, in accordance with an embodiment.

FIG. 1B is a cross section 135 of the front rigid body 105 of the HMD 100 in FIG. 1A, in accordance with an embodiment. As shown in FIG. 1B, the front rigid body 105 includes an electronic display 140 that provides image light to an eye box 145, and an optical block 150. The eye box 145 is a location of the front rigid body 105 where a user's eye 190 is positioned. For purposes of illustration, FIG. 1B shows a cross section 135 associated with a single eye 190, but an optical block 150, and/or electronic display 140 may provide altered image light to another eye of the user and to track the user's another eye.

The electronic display 140 displays images to the user. In various embodiments, the electronic display 140 may comprise a single electronic display or multiple electronic displays (e.g., a display for each eye of a user). Examples of the electronic display 140 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. The electronic display 140 emits content within a first band of light (e.g., in a visible band).

The optical block 150 includes a beamsplitter assembly 160, an optics assembly 170, and an eye tracking unit 180. In alternative configurations, different and/or additional components may be included in the optical block 150. Similarly, functionality of one or more of the components can be distributed among the components in a different manner than is described here. For example, all of the functionality of the beamsplitter assembly 160 may be contained within the optics assembly 170. In another example, the beamsplitter assembly 160 includes multiple components (e.g., including a circular polarizer and a beamsplitter), and some (e.g., the circular polarizer) of the components are included in the optics assembly 170.

The beamsplitter assembly 160 transmits light within the first band and reflects light within a second band. For example, the beamsplitter assembly 160 may transmit light within a visible band (e.g., 400-700 nanometers (nm)), and may reflect light within an infrared (IR) band (e.g., above 780 nm). Additionally, the beamsplitter assembly 160 may transmit light within a first visible band and may reflect light within a second visible band. The first visible band is different from the second visible band, and may be separate from the second visible band. Alternatively, the beamsplitter assembly 160 may transmit light within a first IR band and may reflect light within a second IR band. The first IR band is different from the second IR band, and may be separate from the second IR band. In some embodiments, the beamsplitter assembly 160 transmits light within the first band, reflects light within the second band, and reflects light within a third band. The third band is separate from the first band and the second band. The third band may be a visible band or an IR band.

In some embodiments, the beamsplitter assembly 160 may preserve polarization of light when the beamsplitter assembly 160 transmits and/or reflects light within one or more bands. For example, the beamsplitter assembly 160 may preserve polarization of light when the beamsplitter assembly 160 transmits and/or reflects light within an infrared band. In some embodiments, the beamsplitter assembly 160 may transmit light within one or more bands independently of polarization. For example, the beamsplitter assembly 160 may transmit light within a visible band independently of polarization. In some embodiments, the beamsplitter assembly 160 may partially reflect and/or transmit light within one or more bands based on a split in polarization. For example, the beamsplitter assembly 160 may partially reflect P-polarized light that has an electric field polarized parallel to an incidence plane, and may partially transmit S-polarized light that has an electronic field polarized perpendicular to the incidence plane.

In some embodiments, the beamsplitter assembly 160 includes one or more beamsplitters. Additionally and/or alternatively, the beamsplitter assembly 160 may also include, one or more polarizers, one or more wave plates, or some combination thereof. For example, the beamsplitter assembly 160 includes one or more spectrally selective components (such as dichroic beamsplitters, hot mirrors,), one or more polarization sensitive components (such as reflective polarizers), or both.

In some embodiments, the beamsplitter assembly 160 includes a curved beamsplitter that separates light of a first band from light of a second band, and directs light of the second band towards the eye tracking unit 180. The curved beamsplitter may include one or more optical surfaces that have an aspheric surface profile, a spherical surface profile, a freeform surface profile, a convex surface profile, a concave surface profile, or some combination thereof. In some embodiments, the curved beamsplitter may include a monolithic optical element or a plurality of optical elements that are coupled together.

For example, the curved beamsplitter can be partially curved. The partially curved beamsplitter includes a first region, a second region, and a portion that joins the first region and the second region. This portion is curved such that an angle between the first region and an optical axis is larger than an angle between second region and the optical axis. Examples of the partially curved beamsplitter are described in detail below in FIGS. 2A-2C.

In alternate embodiments, the beamsplitter is fully curved (may also be referred to as a convex beamsplitter). For example, the convex beamsplitter tilts towards the optics assembly 170 at a nominal angle of between 30 and 50 degrees to a preferred viewing direction. One end of the convex beamsplitter is closer to the optics assembly 160 than the other to reflect IR light from the eye box 145. The convex beamsplitter may include one or more convex optical surfaces (e.g., a convex aspheric surface profile, a convex spherical surface profile, a convex cylindrical surface profile, a convex freeform surface profile, or some combination thereof). Examples of convex beamsplitter may include a convex aspheric hot mirror, a convex cylindrical hot mirror, a convex spherical hot mirror, or a convex freeform hot mirror. Curved surfaces of the convex beamsplitter cause a higher dynamic range of reflection angles than a dynamic range of reflection angles of the flat beamsplitter. As such, the convex beamsplitter allows increasing a field of view (FOV) of the eye tracking unit 180. An example is described in detail in FIG. 3.

In some embodiments, the beamsplitter assembly 160 mitigates stray visible light as a result of reflections emanating from the optics assembly 170. The stray visible light is light from one or more pixels on the electronic display 140 that is reflected by the optics assembly 170 to the beamsplitter assembly 160. To mitigate the stray visible light, the beamsplitter assembly 160 includes one or more polarizers (e.g., a circular polarizer) in addition to the beamsplitters (e.g., a partially curved beamsplitter, a convex beamsplitter, or a flat beamsplitter). A circular polarizer is formed using two optical surfaces, a first surface and a second surface. A quarter waveplate is coupled to the front surface and a linear polarizer (e.g., absorptive) is coupled to the back surface. The first surface and the second surface may be, e.g., a front and back surface on a same optical element. In alternate embodiments, the first and second surface are surfaces on separate optical elements. The quarter wave plate is positioned after the optics assembly 170 and before the linear adsorptive polarizer that is before the beamsplitter. In some embodiments, high quality beam splitting coatings can be used to mitigate the stray visible light. Such beamsplitter assembly 160 reduces noises and/or contrast loss caused by the stray visible light.

In some embodiments, the beamsplitter assembly 160 directs reflected light from multiple FOVs of the eye 190 with different directions to the eye tracking unit 180. By implementing algorithms that incorporate triangulation of light from the multiple FOVs, an axial location of the eye 190 can be determined. The beamsplitter assembly 160 can be a single optical element or multiple optical elements. For example, the beamsplitter assembly 160 is a single optical element that has a first beamsplitter on a first surface of the optical element, and has a second beamsplitter on a second surface of the optical element. The second surface is opposite the first surface. In another example, the beamsplitter assembly 160 includes a single beamsplitter, each surface having a different FOV from each other, to simultaneously direct light reflected from each FOV to the eye tracking unit 180. Each surface of the single beamsplitter can be curved, flat, spectrally discriminating, polarization discriminating or some combination thereof. In some embodiments, the beamsplitter assembly 160 includes multiple beamsplitters, each having a different FOV from each other, to simultaneously direct light reflected from each FOV to the eye tracking unit 180. Each of the multiple beamsplitters can be curved, flat, spectrally discriminating, polarization discriminating or some combination thereof. Angles that each corresponds to a location of each of the multiple beamsplitters and separations among the multiple beamsplitters are adjustable to vary the multiple FOVs. For example, the beamsplitter assembly 160 includes more than one hot mirrors (e.g., partially curved hot mirrors, convex hot mirrors, flat hot mirrors, or some combination thereof) to direct IR light from different FOVs into the eye tracking unit 180.

The optics assembly 170 magnifies received visible image light from the electronic display 140, corrects optical errors associated with the image light, and the corrected image light is presented to the eye 190. The optics assembly 170 includes one or more optical elements. An optical element is, e.g., an aperture, a pancake lens, a Fresnel lens, a convex lens, a concave lens, a filter, any other suitable optical element that affects the image light emitted from the electronic display 140, or some combination thereof. Moreover, the optics assembly 170 may include combinations of different optical elements. In some embodiments, one or more of the optical elements in the optics assembly 170 may have one or more coatings, such as partial reflectors or anti-reflective coatings.

Magnification of the image light by the optics assembly 170 allows the electronic display 140 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics assembly 170 is designed so its effective focal length is larger than the spacing to the electronic display 140, which magnifies the image light projected by the electronic display 140. Additionally, in some embodiments, the amount of magnification may be adjusted by adding or removing optical elements.

The optics assembly 170 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 140 for display is pre-distorted, and the optics assembly 170 corrects the distortion when it receives image light from the electronic display 140 generated based on the content.

The eye tracking unit 180 tracks movement of the eye 190. Some or all of the eye tracking unit 180 may or may not be in a line of sight of a user wearing the HMD 100. The eye tracking unit 180 is typically located off-axis to avoid obstructing the user's view of the electronic display 140, although the eye tracking unit 180 may alternately be placed elsewhere. Also, in some embodiments, there is at least one eye tracking unit 180 for the user's left eye and at least one eye tracking unit 180 for the user's right eye. In some embodiments, only one eye tracking unit 180 may track both the left and right eye of the user.

The eye tracking unit 180 may include one or more illuminators 182, one or more detectors 184, and a controller 186. The eye tracking unit 180 determines eye tracking information using data (e.g., images) captured by the detector(s) 184 of the eye 190. Eye tracking information describes a position of an eye of the user. Eye tracking information may include, e.g., gaze angle, eye orientation, inter-pupillary distance, vergence depth, some other metric associated with tracking an eye, or some combination thereof. Some embodiments of the eye tracking unit have different components than those described in FIG. 1B.

An illuminator 182 illuminates a portion of the user's eye 190 with light in the second band of light (e.g., IR light) that is different from the first band of light (e.g., visible light) associated with content from the electronic display 140. Examples of the illuminator 182 may include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illuminator 182 may emit visible light. In some embodiments, the eye tracking unit 180 may include multiple illuminators 182 for illuminating one or more portions of the eye 190. In some embodiments, the light emitted from the one or more illuminators 182 is a structured light pattern.

Reflected and/or scattered light from the illuminated portion of the eye 190 passes through the optics assembly 170 and is re-directed by the beamsplitter assembly 160 to the detector(s) 184. The beamsplitter assembly 160 separates the light in the second band from visible light of the electronic display 140, meanwhile mitigating stray visible light reflected from the optics assembly 170. The beamsplitter assembly 160 curves one or more portions that are not used for re-directing light to reduce its space. As such, the detector 184 can be placed closer to the beamsplitter assembly 160 to reduce a form factor of the optical block 150.

The detector 184 detects reflected and/or scattered light from the illuminated portion of the eye 190. The detector 184 outputs a detection signal proportional to the detected light. The detection signal corresponds to a reflectance of the illuminated portion of the eye 190 which correlates with an apparent contrast change (e.g., a contrast change of corneal reflection) through the illuminated portion of the user's eye 190. The detector 184 is a device that converts light into electronic signals. The spectral sensitivity of the detector 184 may be in an infrared band or a visible band depending on the illuminator 182. In some embodiments, the detector 184 may be based on single-point detection (e.g., photo-diode, balanced/matched photodiodes, or avalanche photo-diode), or based on one or two-dimensional detector arrays (e.g., a camera, linear photodiode array, CCD array, or CMOS array). In some embodiments, the eye tracking unit 180 may include multiple detectors 184 to capture light reflected from one or more illuminated portions of the eye 190.

The controller 186 determines eye tracking information using data (e.g., captured images) from the one or more detectors 184. For example, in some embodiments, the controller 186 identifies locations of reflections of light from the one or more illuminators 182 in an image of the eye 190, and determines a position and an orientation of the eye 190 based on the shape and/or locations of the identified reflections. In cases where the eye 190 is illuminated with a structured light pattern, the controller 186 can detect distortions of the structured light pattern projected onto the eye 190, and can estimate a position and an orientation of the eye 190 based on the detected distortions. The controller 186 can also estimate a pupillary axis, a gaze angle (e.g., corresponds to a foveal axis), a translation of the eye, a torsion of the eye, and a current shape of the eye 190 based on the image of the illumination pattern captured by the detector 184.

Examples of Beamsplitter Assembly

Figure 2A:
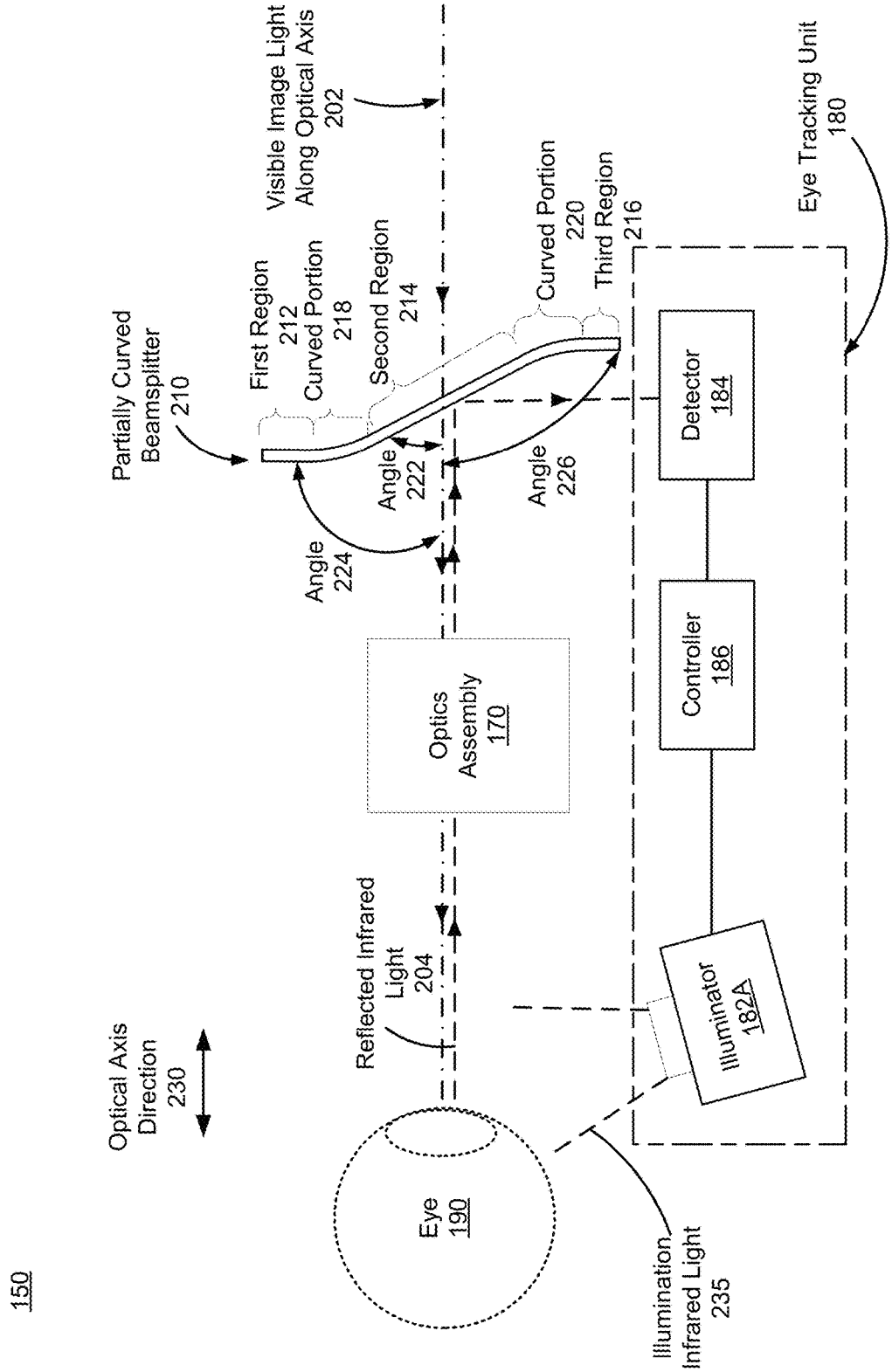
FIG. 2A is a block diagram of an optical block including a partially curved beamsplitter in a HMD, in accordance with an embodiment.

FIG. 2A is a block diagram of the optical block 150 including a partially curved beamsplitter 200 in a HMD, in accordance with an embodiment. The HMD may be, e.g., the HMD 100, or some other HMD. In the example of FIG. 2A, the optical block 150 includes a partially curved beamsplitter 210, the optics assembly 170, and the eye tracking unit 180.

The partially curved beamsplitter 210 separates visible image light 202 from reflected IR light 204, and directs reflected IR light 204 towards the eye tracking unit 180. The partially curved beamsplitter 210 includes a first region 212, a second region 214, a third region 216, a first curved portion 218 that joins the first region 212 and the second region 214, and a second curved portion 220 that joins the second region 214 and the third region 216. An angle 222 between the first region 212 and the optical axis direction 230 is larger than an angle 224 between second region 214 and the optical axis direction 230. An angle 226 between the third region 216 and the optical axis direction 230 is larger than the angle 222. The first curved portion 218 or the second curved portion 220 may have one or more optical surfaces that have an aspheric surface profile, a spherical surface profile, a cylindrical surface profile, a curved freeform surface profile, or some combination thereof. The first curved portion 218 and the second curved portion 220 may have same or different surface profiles. For example, the first curved portion 218 has a cylindrical surface profile that can represented by a first radius of curvature. To be different from the first curved portion 218, the second curved portion 220 may have a cylindrical surface profile that can represented by a second radius of curvature that is different from the first radius of curvature. Alternatively, the second curved portion 220 may have a spherical surface profile that can be represented by two radii of curvature.

The partially curved beamsplitter 210 transmits visible image light 202 from the electronic display 140 (not shown) and the transmitted visible image light 202 is then transmitted by the optics assembly 170 and is output towards an eye box that includes the eye 190. The illuminator 182A illuminates a portion of the eye 190 using illumination IR light 235 (shown in dash lines). The reflected IR light 204 from the illuminated portion of the eye 190 passes through the optics assembly 170 and is reflected by the partially curved beamsplitter 210 to the detector 184. The partially curved beamsplitter 210 separate the reflected IR light 204 from the visible image light 202 of the electronic display 140. The curved portions of the partially curved beamsplitter 210 reduces space of the optical block 150. As such, the optical assembly 170 can be placed closer to the electronic display 140, and the detector 184 can be placed closer to the partially curved beamsplitter 210 for reducing the form factor of the optical block 150.

The controller 186 controls the illuminator 182A to illuminate the eye 190, such as turning on and turning off the illuminator 182A, changing illumination positions, and instructing the illuminator 182A to illuminate a structural pattern. The controller 186 also controls the detector 184, such as controlling settings (e.g., exposure time, and gain,), and analyzing data from the detector 184 to estimate the eye's movement.

As shown in FIG. 2A, the second region 214 is used to direct reflected IR light 204 to the eye tracking unit 180, and the remaining portions (e.g., the first region 212, the third region 216, the curved portions 218 and 220) that are not used to direct reflected IR light 204 are deformed such that orientations of the remaining portions are changed to reduce space between the optics assembly 170 and the electronic display 140 (not shown). As such, the HMD's FOV, and a FOV of the eye tracking unit 180 have room to be increased. Due to less space used for the partially curved beamsplitter 210, varifocal architectures (e.g., pancake lens and a varifocal element) can be applied in the HMD.

Figure 2B:
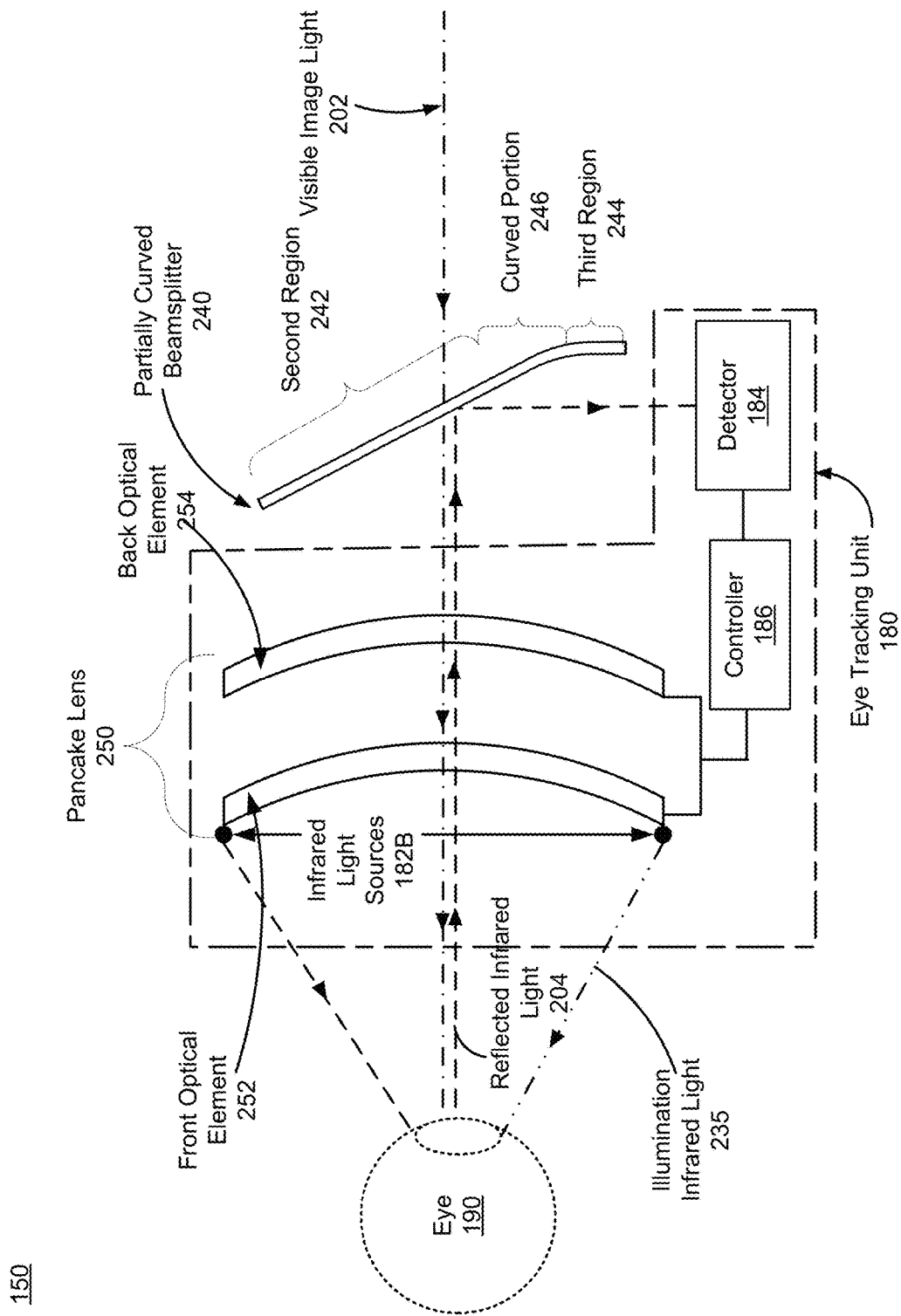
FIG. 2B is a block diagram of an optical block including a partially curved beamsplitter and a pancake lens in the HMD, in accordance with an embodiment.

FIG. 2B is a block diagram of an optical block (e.g., the optical block 150) including a partially curved beamsplitter 240 and a pancake lens 250 in a HMD, in accordance with an embodiment. The HMD may be, e.g., the HMD 100, or some other HMD. Compared with the partially curved beamsplitter 210, the partially curved beamsplitter 240 has a second region 242 is made use of by the HMD 100, a third region 244, and a second curved portion 246 that joins the second region 242 and the third region 244. The second curved portion 246 may have one or more optical surfaces that have an aspheric surface profile, a spherical surface profile, a cylindrical surface profile, a curved freeform surface profile, or some combination thereof. The space reduced by the partially curved beamsplitter 240 allows the pancake lens 250 to vary a focal length (or optical power) of the HMD 100. In this example, the optics assembly 170 is the pancake lens 250 that is controlled by the controller 186 to vary a focal length (or optical power) of the HMD 100 to keep a user's eyes in a zone of comfort as vergence and accommodation change. The controller 186 has a varifocal element that is able to change a distance between an optical element in the pancake lens 250 and an electronic display (e.g., the electronic display 140), and thereby adjust a location of an image plane for content being presented to a use of the HMD. The pancake lens 250 includes a front optical element 252 and a back optical element 254. One or more surfaces of front optical element 252 may be shaped to be spherically concave (e.g., a portion of a sphere), spherically convex, a rotationally symmetric asphere, a freeform shape, or some other shape that mitigates field curvature. In some embodiments, the shape of one or more surfaces of front optical element 252 and back optical element 254 are designed to additionally correct for other forms of optical aberration. In some embodiments, one or more of the optical elements within pancake lens 250 may have one or more coatings, such as anti-reflective coatings, to reduce ghost images and enhance contrast. The pancake lens 250 is further described in U.S. Patent Application No. 62/350,644, filed on Jun. 15, 2016, U.S. patent application Ser. No. 15/179,883, filed on Jun. 10, 2016, and U.S. patent application Ser. No. 15/441,738, filed on Feb. 24, 2017, each of which is hereby incorporated by reference in its entirety.

The IR light sources 182B are arranged around the edge of the front optical element 252 to provide the illumination IR light 235. In some embodiments, the IR light sources 182B pointed at the top of the partially curved beamsplitter 240 such that the illumination IR light 235 reflects to illuminate the eye 190. In some embodiments, the IR light sources 182B are placed between the eye 190 and the pancake lens 250, or are placed between the partially curved beamsplitter 240 and the pancake lens 250, or are placed on the partially curved beamsplitter 240, or are placed between the partially curved beamsplitter 240 and the electronic display 140 (not shown), or are placed down by the detector 184. The above placements can be achieved using waveguides. In some embodiments, the IR light sources 182B have small sizes such that the IR light sources 182B can be invisible to the eye 190. In some embodiments, the partially curved beamsplitter 240 can be replaced by the partially curved beamsplitter 210.

Figure 2C:
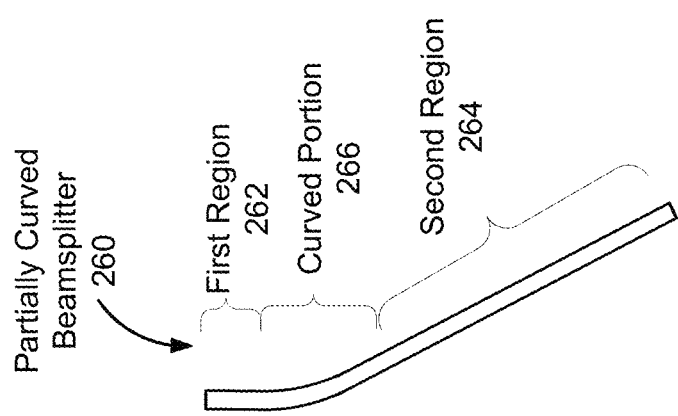
FIG. 2C is a block diagram of a partially curved beamsplitter, in accordance with an embodiment.

FIG. 2C is a block diagram of a partially curved beamsplitter 260, in accordance with an embodiment. Compared with the partially curved beamsplitter 210, the partially curved beamsplitter 260 has a first region 262, a second region 264 that is made use of by the HMD 100, and a first curved portion 266 that joins the first region 262 and the second region 264. The first curved portion 266 may have one or more optical surfaces that have an aspheric surface profile, a spherical surface profile, a cylindrical surface profile, a curved freeform surface profile, or some combination thereof. The partially curved beamsplitter 260 may replace the partially curved beamsplitter 210 in FIG. 2A or the partially curved beamsplitter 240 in FIG. 2B.

Figure 3:
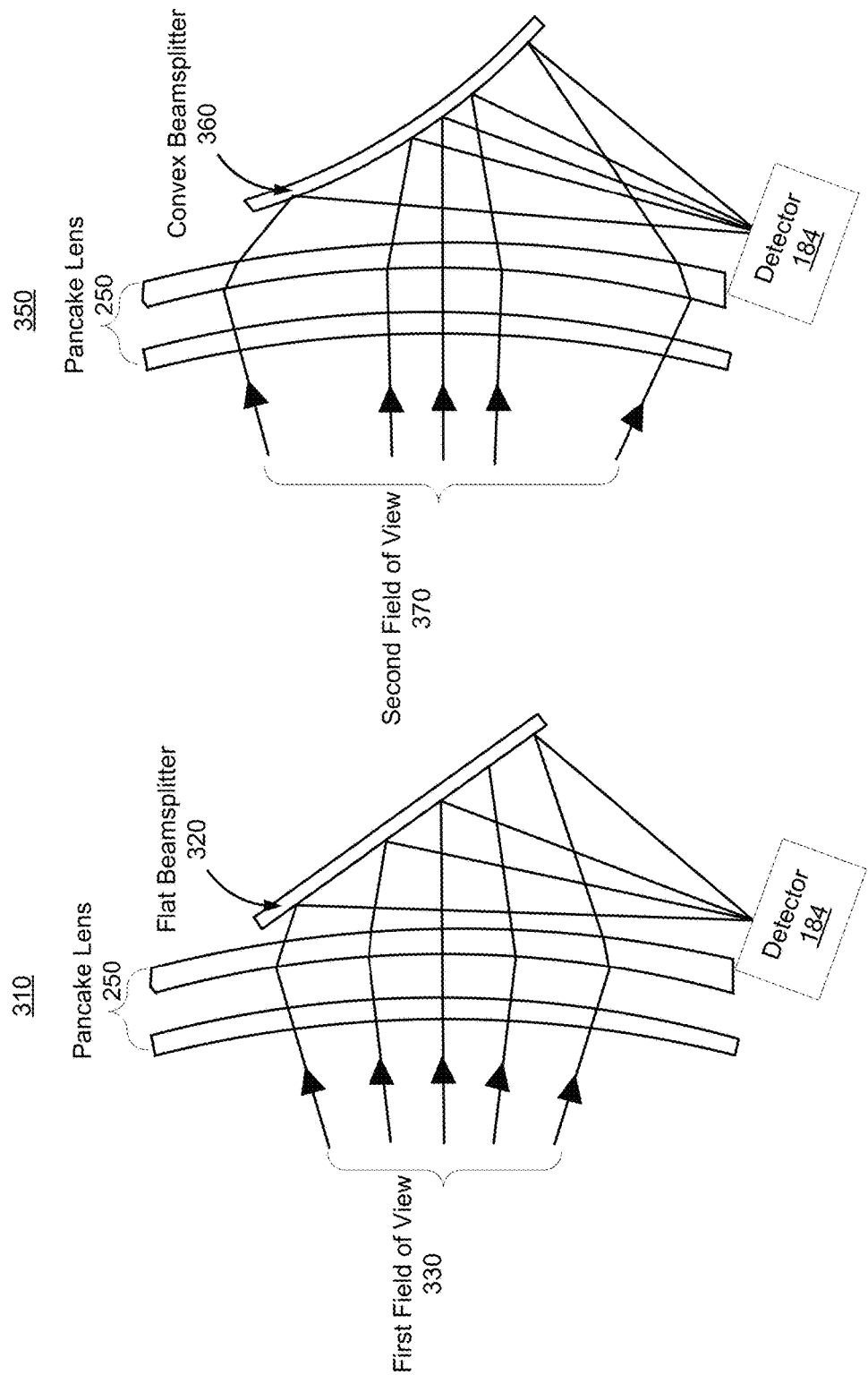
FIG. 3 is a block diagram of an optical block including a flat beamsplitter in comparison with an optical block including a convex beamsplitter in a HMD, in accordance with an embodiment.

FIG. 3 is a block diagram of an optical block 310 including a flat beamsplitter 320 in comparison with an optical block 350 including a convex beamsplitter 360 in a HMD, in accordance with an embodiment. The flat beamsplitter 320 may be a hot mirror that reflects light in the second band (e.g., IR light) and transmits light in the first band (e.g., visible light). The flat beamsplitter 320 directs IR light reflected from a first FOV 330 passing through the pancake lens 250 to the detector 184. The convex beamsplitter 360 is an embodiment of the beamsplitter assembly 160. The convex beamsplitter 360 tilts towards the pancake lens 250 at a nominal angle of between 30 and 50 degrees to a preferred viewing direction. One end of the convex beamsplitter 360 is closer to the pancake lens 250 than the other end to reflect IR light from the eye to the detector 184. The convex beamsplitter 360 may have one or more optical surfaces that have an aspheric surface profile, a spherical surface profile, a cylindrical surface profile, a curved freeform surface profile, or some combination thereof.

The convex beamsplitter 360 directs IR light from a second FOV 370 to the detector 184. In some embodiments, the 2-fold increase in the second FOV can be achieved. Curved surfaces of the convex beamsplitter 360 cause a higher dynamic range of reflection angles than a dynamic range of reflection angles of the flat beamsplitter 320. As such, the second FOV 370 is larger than the first FOV 330. The convex beamsplitter 360 allows increasing FOV of the detector 184.

Figure 4:
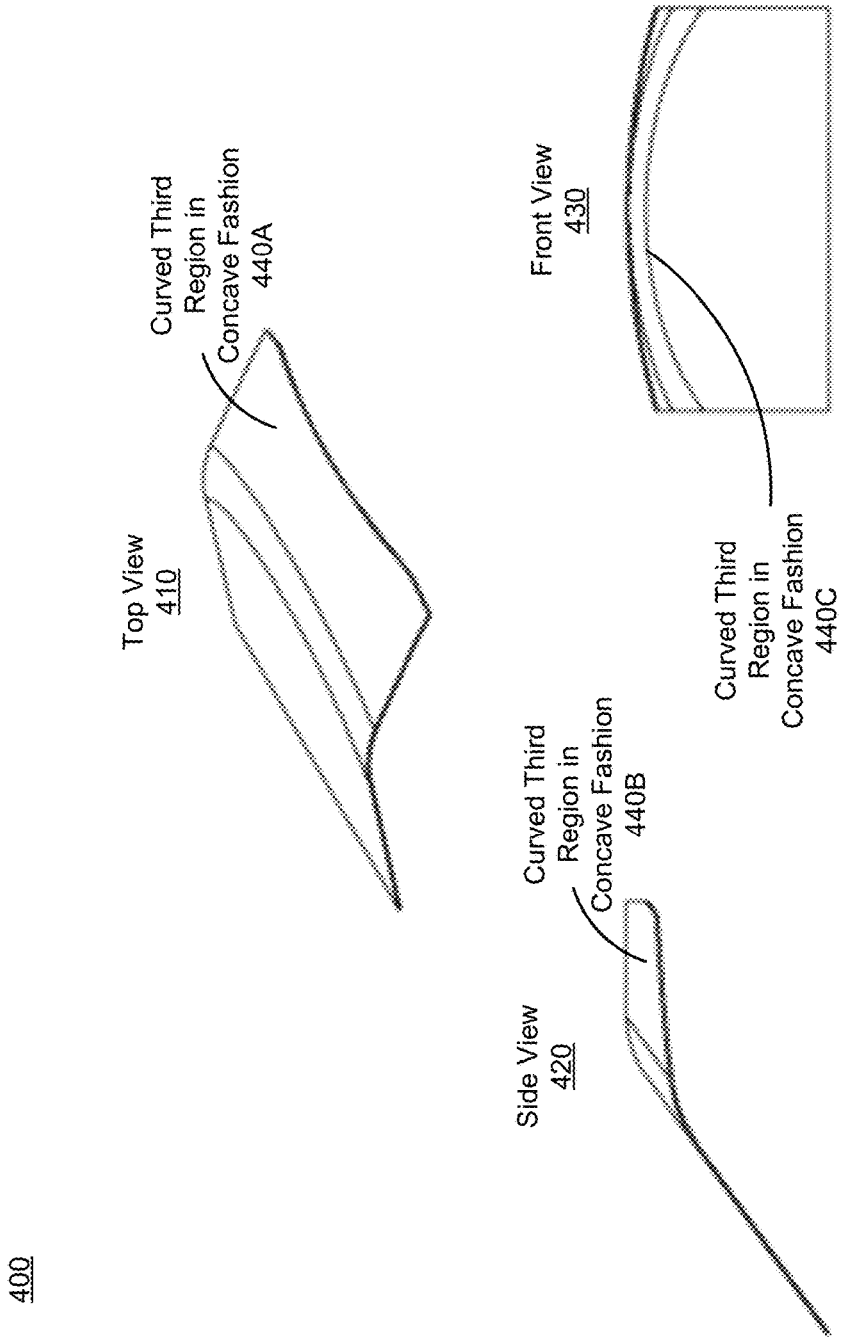
FIG. 4 illustrates multiple views of a partially curved beamsplitter with an axis of rotational symmetry, in accordance with an embodiment.

FIG. 4 illustrates multiple views of a partially curved beamsplitter 400 with an axis of rotational symmetry, in accordance with an embodiment. The partially curved beamsplitter 400 is one embodiment of the partially curved beamsplitter 240. The third region (440A, 440B, and 440C) is slightly curved in a concave fashion. FIG. 4 shows a top view 410, a side view 420 and a front view 430 of the curved third region (440A, 440B, and 440C). The curved third region (440A, 440B, and 440C) gives the partially curved beamsplitter 400 the axis of rotational symmetry that allows the partially curved beamsplitter 400 to be diamond turned. Due to the axis of rotational symmetry, a manufacturing process of the partially curved beamsplitter 400 is greatly simplified.

In some embodiments, the beamsplitter assembly 160 is non-rotationally symmetric. For example, the beamsplitter assembly 160 is curved in one direction, but not in the other direction. The non-rotationally symmetric feature of the beamsplitter assembly 160 may cause a change in distortion in a display path that is localized and non-rotationally symmetric. A perceived distortion depends on a radius of a curved portion of the beamsplitter assembly 160, and the perceived distortion gets worse as the radius gets smaller. This non-rotationally symmetric distortion can be mitigated by getting a measurement of a two-dimensional tan angles of each pixel at an exit pupil plane. By using the two-dimensional tan angles of each pixel, the distortion can be corrected through rendering. If the curved portion gets further away from the electronic display 140, the distortion correction depends on a position of an ocular pupil position. This can in turn be mitigated using eye tracking if the pupil of the eye is tracked in real time.

Example of Beamsplitter Assembly in Head-Mounted Display

Figure 5:
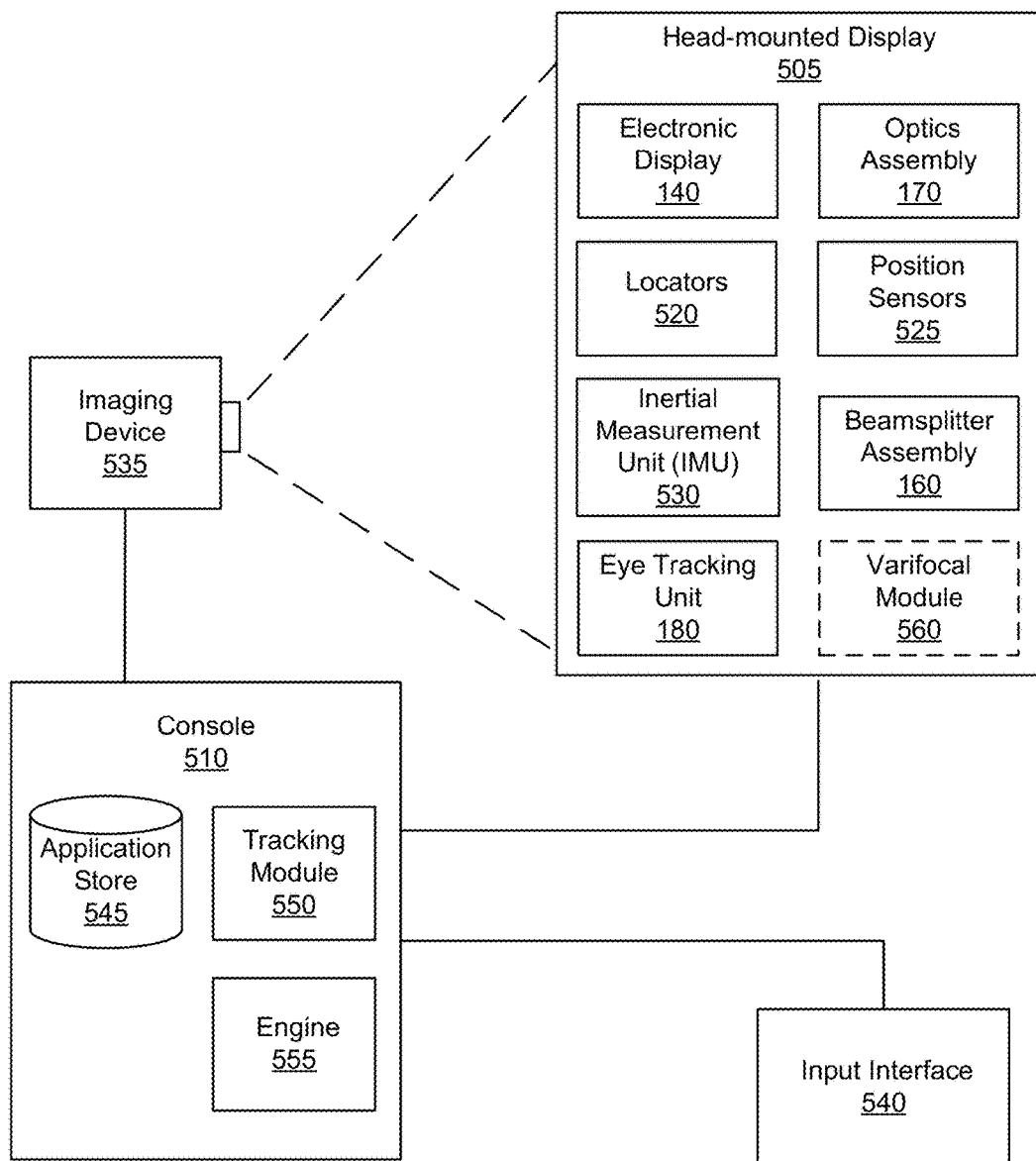
FIG. 5 is a block diagram of a HMD system environment including a beamsplitter assembly, in accordance with an embodiment.

FIG. 5 is a block diagram of a HMD system 500 environment including a beamsplitter assembly 160, in accordance with an embodiment. The system 500 shown by FIG. 5 comprises a HMD 505, an imaging device 535, and an input interface 540 that are each coupled to the console 510. While FIG. 5 shows an example system 500 including one HMD 505, one imaging device 535, and one input interface 540, in other embodiments any number of these components may be included in the system 500. For example, there may be multiple HMDs 505 each having an associated input interface 540 and being monitored by one or more imaging devices 535, with each HMD 505, input interface 540, and imaging devices 535 communicating with the console 510. In alternative configurations, different and/or additional components may be included in the system 500. Similarly, functionality of one or more of the components can be distributed among the components in a different manner than is described here. For example, some or all of the functionality of the console 510 may be contained within the HMD 505. The system 500 may operate in a VR system environment, an AR system environment, a MR system environment, or some combination thereof.

The HMD 505 presents content to a user. In some embodiments, the HMD 505 is the HMD 100. Examples of content presented by the HMD 505 include one or more images, video, audio, or some combination thereof. In some embodiments, audio is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 505 may present VR, AR, MR, or some combination thereof to a user. In the AR and/or MR embodiments, the HMD 505 may augment views of a physical, real-world environment with computer-generated elements (e.g., images, video, sound, etc.).

The HMD 505 includes an electronic display 140, the optics assembly 170, one or more locators 520, one or more position sensors 525, an inertial measurement unit (IMU) 530, the beamsplitter assembly 160, the eye tracking unit 180, and a varifocal module 560 (optional). Some embodiments of the HMD 505 have different components than those described here. Similarly, the functions can be distributed among other components in the system 500 in a different manner than is described here. For example, some of the functions of the varifocal module 560 may be performed by the eye tracking unit 180. Some of the functions of the eye tracking unit 180 may be performed by the console 510.

The electronic display 140 displays images to the user in accordance with data received from the console 510.

The optical assembly 170 magnifies image light received from the electronic display 140, corrects optical errors associated with the image light, and presents the corrected image light to a user of the HMD 505. In some embodiments, the optics assembly 170 includes the pancake lens 250 to vary a focal length of the system 500. In some embodiments, the pancake lens 250 is controlled by the varifocal module 560. The beamsplitter assembly 160 (e.g., a partially curved beamsplitter, a convex beamsplitter, a circular polarizer integrated with one of the above beamsplitters, a circular polarizer integrated with a flat beamsplitter, or some combinations thereof) transmits the visible image light passing through the optics assembly 170 towards the user's eye. The beamsplitter assembly 160 also directs IR light reflected from the user's eye to the eye tracking unit 180 for estimating the eye's movement. The beamsplitter assembly 160 separate the reflected and/or IR light from the visible light of the electronic display 140, meanwhile mitigating stray visible light reflected from the optics assembly 170. The beamsplitter assembly 160 curves one or more portions that are not used for re-directing light to reduce the beamsplitter's space. As such, the eye tracking unit 180 can be placed closer to the beamsplitter assembly 160 for reducing the form factor of the optical block 150. Additionally, if the eye tracking unit 180 has multiple FOVs, the beamsplitter assembly 160 re-directs light reflected from each of the multiple FOVs to the detector 184 for determining the axial location of the eye.

The eye tracking unit 180 is integrated into the HMD 505. The eye tracking unit 180 determines eye tracking information associated with an eye of a user wearing the HMD 505. The eye tracking unit 180 receives light from the beamsplitter assembly 160 that it uses to determine eye tracking information. The eye tracking information determined by the eye tracking unit 180 may comprise information about a position of the user's eye, i.e., information about an angle of an eye-gaze.

The varifocal module 560 includes a varifocal element that causes the pancake lens 250 to vary the focal length (or optical power) of the HMD 505 to keep a user's eyes in a zone of comfort as vergence and accommodation change. In one embodiment, the varifocal module 560 physically changes the distance between the two optical elements of pancake lens 250. Alternatively, the varifocal module 560 changes the focal length of pancake lens 250 by applying a force to one of the back optical element 254 or the front optical element 252 described in FIG. 2B.

The locators 520 are objects located in specific positions on the HMD 505 relative to one another and relative to a specific reference point on the HMD 505. A locator 520 may be a light emitting diode (LED), a corner cube reflector, a reflective marker, a type of light source that contrasts with an environment in which the HMD 505 operates, or some combination thereof. In embodiments where the locators 520 are active (i.e., an LED or other type of light emitting device), the locators 520 may emit light in the visible band (~380 nm to 750 nm), in the IR band (~750 nm to 1700 nm), in the ultraviolet band (200 nm to 380 nm), some other portion of the electromagnetic spectrum, or some combination thereof.

In some embodiments, the locators 520 are located beneath an outer surface of the HMD 505, which is transparent to the wavelengths of light emitted or reflected by the locators 520 or is thin enough not to substantially attenuate the wavelengths of light emitted or reflected by the locators 520. Additionally, in some embodiments, the outer surface or other portions of the HMD 505 are opaque in the visible band of wavelengths of light. Thus, the locators 520 may emit light in the IR band under an outer surface that is transparent in the IR band but opaque in the visible band.

The IMU 530 is an electronic device that generates fast calibration data based on measurement signals received from one or more of the position sensors 525. A position sensor 525 generates one or more measurement signals in response to motion of the HMD 505. Examples of position sensors 525 include: one or more accelerometers, one or more gyroscopes, one or more magnetometers, another suitable type of sensor that detects motion, a type of sensor used for error correction of the IMU 530, or some combination thereof. The position sensors 525 may be located external to the IMU 530, internal to the IMU 530, or some combination thereof.

Based on the one or more measurement signals from one or more position sensors 525, the IMU 530 generates fast calibration data indicating an estimated position of the HMD 505 relative to an initial position of the HMD 505. For example, the position sensors 525 include multiple accelerometers to measure translational motion (forward/back, up/down, left/right) and multiple gyroscopes to measure rotational motion (e.g., pitch, yaw, and roll). In some embodiments, the IMU 530 rapidly samples the measurement signals and calculates the estimated position of the HMD 505 from the sampled data. For example, the IMU 530 integrates the measurement signals received from the accelerometers over time to estimate a velocity vector and integrates the velocity vector over time to determine an estimated position of a reference point on the HMD 505. Alternatively, the IMU 530 provides the sampled measurement signals to the console 510, which determines the fast calibration data. The reference point is a point that may be used to describe the position of the HMD 505. While the reference point may generally be defined as a point in space; however, in practice the reference point is defined as a point within the HMD 505 (e.g., a center of the IMU 130).

The IMU 530 receives one or more calibration parameters from the console 510. As further discussed below, the one or more calibration parameters are used to maintain tracking of the HMD 505. Based on a received calibration parameter, the IMU 530 may adjust one or more IMU parameters (e.g., sample rate). In some embodiments, certain calibration parameters cause the IMU 530 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 535 generates slow calibration data in accordance with calibration parameters received from the console 510. Slow calibration data includes one or more images showing observed positions of the locators 520 that are detectable by the imaging device 535. The imaging device 535 may include one or more cameras, one or more video cameras, any other device capable of capturing images including one or more of the locators 520, or some combination thereof. Additionally, the imaging device 535 may include one or more hardware and software filters (e.g., used to increase signal to noise ratio). The imaging device 535 is configured to detect light emitted or reflected from locators 520 in a field of view of the imaging device 535. In embodiments where the locators 520 include passive elements (e.g., a retroreflector), the imaging device 535 may include a light source that illuminates some or all of the locators 520, which retro-reflect the light towards the light source in the imaging device 535. Slow calibration data is communicated from the imaging device 535 to the console 510, and the imaging device 535 receives one or more calibration parameters from the console 510 to adjust one or more imaging parameters (e.g., focal length, focus, frame rate, ISO, sensor temperature, shutter speed, aperture, etc.).

The input interface 540 is a device that allows a user to send action requests to the console 510. An action request is a request to perform a particular action. For example, an action request may be to start or end an application or to perform a particular action within the application. The input interface 540 may include one or more input devices. Example input devices include: a keyboard, a mouse, a game controller, or any other suitable device for receiving action requests and communicating the received action requests to the console 510. An action request received by the input interface 540 is communicated to the console 510, which performs an action corresponding to the action request. In some embodiments, the input interface 540 may provide haptic feedback to the user in accordance with instructions received from the console 510. For example, haptic feedback is provided when an action request is received, or the console 510 communicates instructions to the input interface 540 causing the input interface 540 to generate haptic feedback when the console 510 performs an action.

The console 510 provides content to the HMD 505 for presentation to the user in accordance with information received from one or more of: the imaging device 535, the HMD 505, the input interface 540, and the eye tracking unit 180. In the example shown in FIG. 1, the console 510 includes an application store 545, a tracking module 550, and an engine 555. Some embodiments of the console 510 have different modules than those described in conjunction with FIG. 1. Similarly, the functions further described below may be distributed among components of the console 510 in a different manner than is described here.

The application store 545 stores one or more applications for execution by the console 510. An application is a group of instructions, that when executed by a processor, generates content for presentation to the user. Content generated by an application may be in response to inputs received from the user via movement of the HMD 505, the input interface 540, or the eye tracking unit 180. Examples of applications include: gaming applications, conferencing applications, video playback application, or other suitable applications.

The tracking module 550 calibrates the system 500 using one or more calibration parameters and may adjust one or more calibration parameters to reduce error in determination of the position of the HMD 505. For example, the tracking module 550 adjusts the focus of the imaging device 535 to obtain a more accurate position for observed locators on the HMD 505. Moreover, calibration performed by the tracking module 550 also accounts for information received from the IMU 530. Additionally, if tracking of the HMD 505 is lost (e.g., the imaging device 535 loses line of sight of at least a threshold number of the locators 520), the tracking module 550 re-calibrates some or all of the system 500.

The tracking module 550 tracks movements of the HMD 505 using slow calibration information from the imaging device 535. The tracking module 550 determines positions of a reference point of the HMD 505 using observed locators from the slow calibration information and a model of the HMD 505. The tracking module 550 also determines positions of a reference point of the HMD 505 using position information from the fast calibration information. Additionally, in some embodiments, the tracking module 550 may use portions of the fast calibration information, the slow calibration information, or some combination thereof, to predict a future location of the HMD 505. The tracking module 550 provides the estimated or predicted future position of the HMD 505 to the engine 555.

The engine 555 executes applications within the system 500 and receives position information, acceleration information, velocity information, predicted future positions, or some combination thereof of the HMD 505 and the eye tracking unit 180 from the tracking module 550. Based on the received information, the engine 555 determines content to provide to the HMD 505 for presentation to the user. For example, if the received information indicates that the user has looked to the left, the engine 555 generates content for the HMD 505 that mirrors the user's movement in a virtual environment. Similarly, if information received from the eye tracking unit 180 indicates the user gazing on a location, the engine 555 generates content based on the identified gazing location, such as a visual representation of the scene at the gazing location with an original display resolution and surrounding scenes with a reduced display resolution. Additionally, in some embodiments, if the received information indicates that tracking of the eye tracking unit 180 is lost, the engine 555 generates content indicating the HMD 505 is to be adjusted for presentation by the HMD 505. Additionally, the engine 555 performs an action within an application executing on the console 510 in response to an action request received from the input interface 540, or the eye tracking unit and provides feedback to the user that the action was performed. The provided feedback may be visual or audible feedback via the HMD 505 or haptic feedback via the input interface 540. For example, the engine 555 receives an action from the eye tracking unit 180 to open an application, so the engine 555 opens the application and presents content from the application to the user via the HMD 505.

In some embodiments, the engine 555 can be configured to utilize, in association with the console 510 and the HMD 505, the eye tracking information obtained from the eye tracking unit 180 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking unit 180, the engine 555 determines resolution of the content provided to the HMD 505 for presentation to the user on the electronic display 140. The engine 555 provides the content to the HMD 505 having a maximum pixel density (maximum resolution) on the electronic display 140 in a foveal region of the user's gaze, whereas the engine 555 provides a lower pixel resolution in other regions of the electronic display 140, thus achieving less power consumption at the HMD 505 and saving computing cycles of the console 510 without compromising a visual experience of the user. In some embodiments, the engine 555 can be configured to optimize the performance of other components of the HMD 505 based on the eye tracking information obtained from the eye tracking unit 180. In an alternate embodiment, the engine 555 can adjust focus of images displayed on the electronic display 140, e.g., to prevent vergence-accommodation conflict.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed:

1. A head-mounted display (HMD) comprising:
   an electronic display configured to output image light;
   an optics assembly configured to direct image light in a first band from the electronic display to an eye box, the optics assembly including one or more optical elements that are positioned along an optical axis, and the eye box is a region in space occupied by an eye of a user of the HMD;
   a compound curved beamsplitter including a first region with a first curvature, a second region with a second curvature, a first portion with a distinct third curvature joining the first region and the second region curved such that an angle between the first region and the optical axis is larger than an angle between second region and the optical axis, a third region, and a second portion joining the second region and the third region curved such that an angle between the third region and the optical axis is larger than the angle between the second region and the optical axis, the beamsplitter positioned along the optical axis between the optics assembly and the electronic display and configured to redirect light in a second band passing through the optics assembly toward a first position and transmit the image light in the first band; and
   an eye tracking unit configured to generate eye tracking information, the eye tracking unit comprising:
      an illuminator configured to illuminate portions of the eye of the user with light in the second band,
      a detector located in the first position, the detector configured to capture light in the second band reflected from the eye of the user through the optics assembly and reflected from the beamsplitter, and
      a controller configured to determine eye tracking information using the captured light in the second band; and
   wherein the HMD is configured to adjust an image displayed on the electronic display based on the eye tracking information.

2. The HMD of claim 1, wherein the beamsplitter is a hot mirror.

3. The HMD of claim 1, wherein the second portion has a different optical surface profile from an optical surface profile of the first portion.

4. The HMD of claim 1, wherein the beamsplitter is a convex beamsplitter, and the beamsplitter is positioned such that one end of the beamsplitter is closer to the optical assembly than the other end.

5. The HMD of claim 4, wherein the convex beamsplitter is a convex cylindrical hot mirror.

6. The HMD of claim 4, wherein the convex beamsplitter is a convex spherical hot mirror.

7. The HMD of claim 1, further comprising a circular polarizer positioned between the beamsplitter and the optics assembly, the circular polarizer configured to mitigate stray visible light as a result of reflections emanating from the optics assembly.

8. The HMD of claim 1, further comprising an additional beamsplitter that re-directs reflected IR from a second field of view through the optics assembly toward the first position, wherein the second field of view is different from a first field of view corresponding to the beamsplitter.

9. The HMD of claim 1, wherein the beamsplitter is on a first surface of an optical element, and the additional beamsplitter is on a second surface of the optical element, and the second surface is opposite the first surface.

10. A head-mounted display (HMD) comprising:
an electronic display configured to output image light;
a pancake lens configured to direct image light in a first band from the electronic display to an eye box, the pancake lens including a front optical element and a back optical element that are positioned along an optical axis, and the eye box is a region in space occupied by an eye of a user of the HMD;
a compound curved beamsplitter including a first region with a first curvature, a second region with a second curvature, a first portion with a distinct third curvature joining the first region and the second region curved such that an angle between the first region and the optical axis is larger than an angle between second region and the optical axis, a third region, and a second portion joining the second region and the third region curved such that an angle between the third region and the optical axis is larger than the angle between the second region and the optical axis, the beamsplitter positioned along the optical axis between the back optical element and the electronic display and configured to redirect light in a second band passing through the pancake lens toward a first position and transmit the image light in the first band; and
an eye tracking unit configured to generate eye tracking information, the eye tracking unit comprising:
an illuminator configured to illuminate portions of the eye of the user of the HMD with light in the second band,
a detector located in the first position, the detector configured to capture light in the second band reflected from the eye of the user through the pancake lens and reflected from the beamsplitter, and
a varifocal element configured to adjust at least one of the front optical element or the back optical element to change a focal length of the pancake lens based at least in part on the determined eye tracking information.

11. The HMD of claim 10, wherein the beamsplitter is a convex beamsplitter, and the beamsplitter is positioned such that one end of the beamsplitter is closer to the pancake lens than the other end.

12. The HMD of claim 10, further comprising a circular polarizer positioned between the pancake lens and the beamsplitter, the circular polarizer configured to mitigate stray visible light as a result of reflections emanating from the pancake lens.

13. The HMD of claim 10, further comprising an additional beamsplitter that directs reflected IR from a second field of view through the pancake lens toward the first position, wherein the second field of view is different from a first field of view corresponding to the beamsplitter.

14. A head-mounted display (HMD) comprising:
an optics assembly configured to direct image light in a first band from an electronic display to an eye box, the optics assembly including one or more optical elements that are positioned along an optical axis, and the eye box is a region in space occupied by an eye of a user of the HMD;
a compound curved beamsplitter including a first region with a first curvature, a second region with a second curvature, a first portion with a distinct third curvature joining the first region and the second region curved such that an angle between the first region and the optical axis is larger than an angle between second region and the optical axis, a third region, and a second portion joining the second region and the third region curved such that an angle between the third region and the optical axis is larger than the angle between the second region and the optical axis, the beamsplitter positioned along the optical axis between the optics assembly and the electronic display and is configured to redirect light in a second band passing through the optics assembly toward a first position and transmit light in the first band; and
an eye tracking unit configured to generate eye tracking information, the eye tracking unit comprising:
a detector located in the first position, the detector configured to capture light in the second band reflected from the eye of the user through the optics assembly and reflected from the beamsplitter, and
a controller configured to determine eye tracking information using the captured light in the second band; and
wherein the HMD is configured to adjust an image displayed on the electronic display based on the eye tracking information.

15. The HMD of claim 14, wherein the beamsplitter is a convex beamsplitter, and the beamsplitter is positioned such that one end of the beamsplitter is closer to the optics assembly than the other end.

16. The HMD of claim 14, further comprising a circular polarizer positioned between the optics assembly and the beamsplitter, the circular polarizer configured to mitigate stray visible light as a result of reflections emanating from the optics assembly.

17. The HMD of claim 15, further comprising an additional beamsplitter that directs reflected IR from a second field of view through the pancake lens toward the first position, wherein the second field of view is different from a first field of view corresponding to the beamsplitter.

18. The HMD of claim 16, wherein the beamsplitter is on a first surface of an optical element, and the additional beamsplitter is on a second surface of the optical element, and the second surface is opposite the first surface.

* * * * *